Sept. 20, 1932.        S. E. BOUCHARD        1,878,370
OPHTHALMIC MOUNTING AND METHOD OF ATTACHING SAME
Filed March 18, 1932
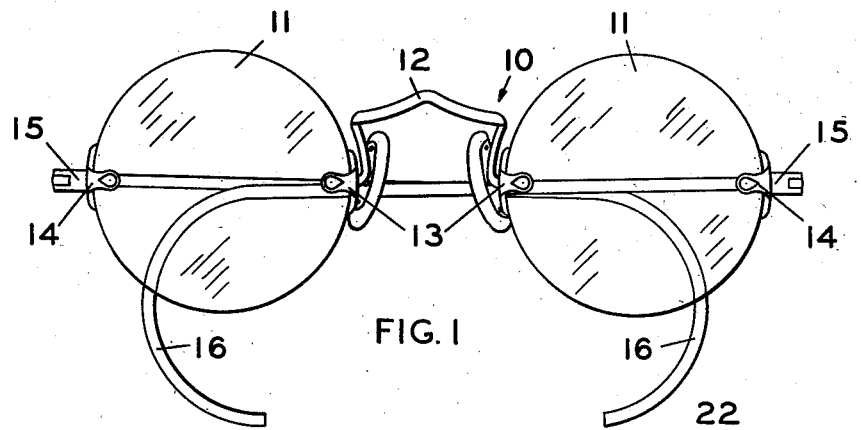
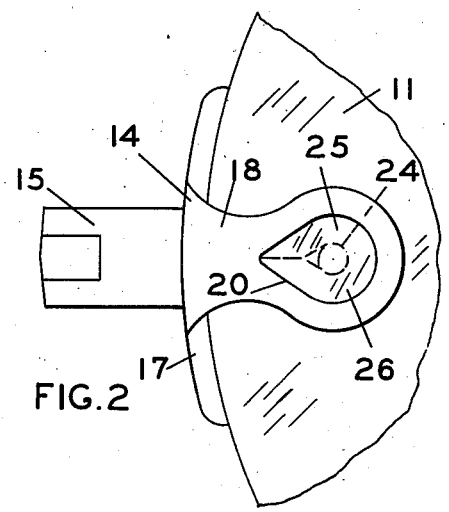
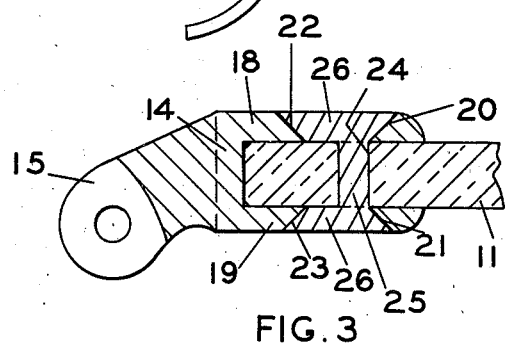
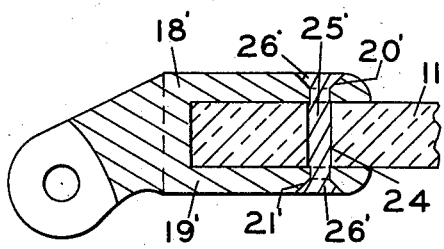
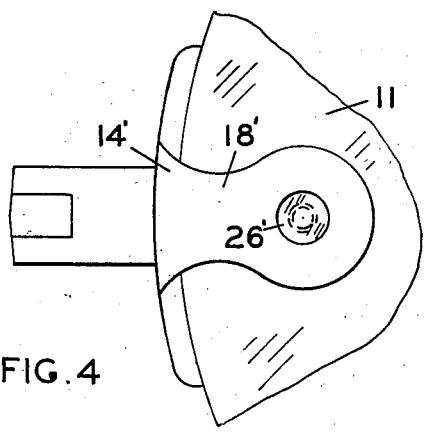
SAMUEL E. BOUCHARD
INVENTOR
BY *G. A. Ellestad*
ATTORNEY Patented Sept. 20, 1932

1,878,370

UNITED STATES PATENT OFFICE

SAMUEL E. BOUCHARD, OF ROCHESTER, NEW YORK, ASSIGNOR TO BAUSCH & LOMB OPTICAL COMPANY, OF ROCHESTER, NEW YORK, A CORPORATION OF NEW YORK

OPHTHALMIC MOUNTING AND METHOD OF ATTACHING SAME

Application filed March 18, 1932. Serial No. 599,825.

This invention relates to ophthalmic mountings and more particularly it has reference to means for securing rimless mountings to ophthalmic lenses.

One of the objects of my invention is to provide an ophthalmic mounting having improved means for securing it to a lens. Another object is to provide an improved method for attaching ophthalmic mountings to lenses. A further object is to provide attaching means whereby an ophthalmic mounting can be conveniently and securely attached to or removed from a lens with a minimum of fitting. A still further object is to provide in an ophthalmic mounting a non-metallic retaining element which can be molded under heat and pressure. These and other objects and advantages reside in certain novel features of construction, arrangement and combination of parts as will hereinafter be more fully described and pointed out in the appended claims.

Referring to the drawing:

Fig. 1 is a front elevation of a pair of spectacles embodying my invention.

Fig. 2 is an enlarged fragmentary view showing a mounting attached to a lens.

Fig. 3 is a sectional view of same.

Fig. 4 is a front elevation of a modified form of lens strap.

Fig. 5 is a sectional view of same.

One embodiment of my invention is shown on the drawing wherein 10 indicates a pair of rimless spectacles embodying two lenses 11 connected by a bridge 12 having the lens clamps 13. Attached to the lenses by clamps 14 are the end pieces 15 which pivotally support the usual temples 16.

The lens clamp 14 comprises the shoe 17 which contacts with the edge of the lens and the two straps 18 and 19 which contact with opposite faces of the lens 11. The straps 18 and 19 are provided, respectively, with apertures 20 and 21 having the sloping walls 22 and 23. The area of the apertures 20 and 21 is greater than that of the opening 24 in the lens 11, as clearly shown in Figs. 2 and 3.

In attaching the clamp 14 to the lens, the straps are placed in position with the apertures opposite the opening in the lens. A non-metallic retaining element 25, having an enlarged head, is then inserted in the apertures and lens opening. The element and clamp are then placed between the heated jaws of a press or a pair of pliers. The heat renders the element plastic and pressure is then applied to the plastic element so that it is forced into intimate contact with the sloping walls of the apertures and the wall of the lens opening. The element and clamp are then permitted to cool down so that the element gets firm. This provides the two integral head portions 26 on the element 25 and since the apertures 20 and 21 are non-circular, the element cannot turn.

The retaining element 25 may be formed of any suitable material which becomes plastic under heat so that it can be molded. I have found that highly satisfactory results can be obtained by making the retaining element out of a pyroxylin material sold under the trade-mark "Lumarith". This substance is a cellulose acetate which has been colloided with suitable plasticizers, pigments and solvents so as to produce a tough, homogeneous material. I can also use zylonite or other suitable substances such as phenolic resin materials for making the retaining element 25. Such substances can be readily softened and made plastic by a reasonable amount of heat. The retaining element should preferably be formed of a material having a softening point which is slightly above the boiling point of water so that cleansing the spectacles with hot water will not loosen the mounted lenses. The lens can be readily removed by applying heat so as to melt the element 25. A new element will, of course, be required for remounting the lens.

In the modification shown in Figs. 4 and 5, a clamp 14' is provided with the straps 18' and 19' having countersunk apertures 20' and 21' in alignment with the opening 24 in lens 11. A non-metallic retaining element 25' is inserted in the apertures and opening and heat and pressure are then applied. The element 25' becomes plastic and after it has cooled down the lens is firmly held in the mounting by means of the two enlarged heads 26' on the element 25'. As shown in Figs. 2 and 3, the strap apertures have an area which is larger than the area of the opening in the lens. This permits the under sides of heads 26 to contact directly with the lens surfaces and when pressure is applied to the plastic substance the clamp 14 is drawn inwardly so the shoe 17 contacts tightly with the edge of the lens.

From the foregoing it will be apparent that I am able to attain the objects of my invention and provide an improved means for mounting a lens in rimless spectacles. My improved mounting can, of course, be used for attaching to a lens various types of ophthalmic mountings such as end pieces, bridges and box studs. The lens can be readily mounted or removed without the labor of carefully fitting and aligning the lens strap holes and the opening in the lens, as is required when using the usual screw mounting. The material for making the retaining elements is relatively cheap and can be had in a variety of different colors. Various modifications can, of course, be made without departing from the spirit of my invention.

I claim:

1. An ophthalmic mounting comprising a member having two spaced straps, each of said straps having an aperture, said straps being positioned on opposite faces of a lens having an opening with said apertures in alignment with the opening and a non-metallic fusible member positioned in said apertures and opening, and anchoring means on one of said straps, said means being engaged by said element whereby said mounting is secured to the lens.

2. In an ophthalmic mounting, the combination of two spaced lens straps each having an aperture opposite an opening in a lens, and a retaining element positioned in said apertures and opening, said element having a head portion and being formed of a phenolic resin material which can be molded under heat and pressure.

3. An ophthalmic mounting comprising a member having two spaced lens straps positioned on opposite faces of a lens, said straps having countersunk apertures positioned opposite an opening in the lens and a pyroxylin retaining element positioned in said opening and having integral heads positioned, respectively, in the two countersunk apertures.

4. An ophthalmic mounting comprising a member having two spaced straps engaged the opposite faces of a lens having an opening, each of said straps having an aperture positioned opposite said opening, each of said apertures having an enlarged portion, and a fusible retaining member positioned in said opening, said retaining member being in contact with the wall of said opening and having integral heads positioned, respectively, in the enlarged portion of each aperture.

5. An ophthalmic mounting comprising a member having two lens straps positioned on opposite faces of a lens having an opening, each of said straps having a recess, a non-metallic retaining element positioned in and substantially filling the opening in the lens, said element having integral enlarged head portions which are positioned, respectively, in the recesses of said straps.

6. An ophthalmic mounting having in combination two spaced lens straps adapted to be positioned on opposite faces of a lens having an opening, each of said straps having an aperture whose area is larger than that of said opening, said straps being positioned with their apertures opposite said opening, and a non-metallic member positioned in said apertures and opening, said member having integral head portions which substantially fill each of said apertures.

7. An ophthalmic mounting having in combination two spaced lens straps each provided with an aperture, said straps being positioned, respectively, on opposite faces of a lens having an opening with the apertures in alignment with said opening, the apertures in said straps being larger in area than the opening and a fusible, non-metallic member positioned in said opening and apertures, said member having integral head portions which fill said apertures and firmly hold said mounting to said lens.

8. The method of attaching an ophthalmic mounting to a lens which comprises the steps of forming a seat in the mounting, drilling a hole in the lens, placing the mounting on the lens with said seat opposite said hole, inserting in said hole a retaining element which can be softened by heat, applying heat to soften said element, applying pressure to force a portion of said softened element into said seat and allowing the element to cool.

9. The method of attaching an ophthalmic mounting to a lens having an opening which comprises the steps of providing said mounting with two spaced straps having apertures larger than the area of said opening, positioning said straps on the lens with the apertures over said opening, inserting in said apertures and opening a non-metallic, fusible member, applying heat and pressure to said member to render it plastic and force the material thereof to fill completely the apertures and opening and then cooling said member.

10. The method of attaching an ophthalmic mounting having a strap to a lens having an opening which comprises the steps of forming anchoring means on said strap, inserting a fusible retaining element in said opening, heating said element to render it plastic and applying pressure to the element which has been rendered plastic to force it into locking engagement with said anchoring means.

11. The method of attaching an ophthalmic mounting having two spaced straps to a lens having an opening which comprises the steps of forming a recessed portion on each of said straps, placing the lens between the straps with the recessed portions in communication with said opening, inserting a fusible retaining element in said opening and applying heat and pressure to form integral head portions on said element with said head portions positioned, respectively, in each of the recessed portions whereby said mounting is fixedly secured to the lens.

12. An ophthalmic mounting comprising a member having two lens straps positioned on opposite faces of a lens having an opening, each of said straps having a recessed portion in communication with the opening in the lens and a non-metallic retaining element positioned in said opening, said element having integral head portions positioned, respectively, in the recessed portion of each of said straps.

13. An ophthalmic mounting comprising two spaced straps, anchoring means on each of said straps, a lens having an opening in communication with the anchoring means of each strap, fusible retaining means positioned in said opening, said retaining means having a portion which is molded to the anchoring means on each of said straps, said retaining means substantially filling said opening and being in contact with its wall.

14. In an ophthalmic mounting the combination of two spaced lens straps positioned, respectively, on opposite sides of a lens having an opening, each of said straps having an enlarged recess portion, each of said portions having an outlet whose area is smaller than the area of the portion, said outlets being in communication with said opening, and a retaining element positioned in said opening, said element having integrally formed enlarged heads seated, respectively, in and filling said recess portions.

15. An ophthalmic mounting comprising a pair of spaced straps positioned, respectively, on opposite faces of a lens having an opening, each of said straps having an aperture in communication with said opening, one of said straps having a seat portion formed in its aperture and a fusible retaining element structurally connecting said straps, said element being positioned in said apertures and opening and having a portion molded into said seat portion whereby said lens is secured to said mounting.

SAMUEL E. BOUCHARD.

CERTIFICATE OF CORRECTION.

Patent No. 1,878,370.  September 20, 1932.

SAMUEL E. BOUCHARD.

It is hereby certified that error appears in the printed specification of the above numbered patent requiring correction as follows: Page 2, line 55, claim 4, for "engaged" read engaging; and that the said Letters Patent should be read with this correction therein that the same may conform to the record of the case in the Patent Office.

Signed and sealed this 29th day of November, A. D. 1932.

(Seal)

M. J. Mooré,
Acting Commissioner of Patents.

DISCLAIMER 1,878,370.—*Samuel E. Bouchard*, Rochester, N. Y. OPHTHALMIC MOUNTING AND METHOD OF ATTACHING. Patent dated September 20, 1932. Disclaimer filed September 13, 1937, by the assignee, *Bausch & Lomb Optical Company*.

Hereby enters this disclaimer to claim 13 of said Letters Patent.

[*Official Gazette October 12, 1937.*]